United States Patent
Matsuo

(10) Patent No.: US 9,819,839 B2
(45) Date of Patent: Nov. 14, 2017

(54) AUDIO/VIDEO REPRODUCTION SYSTEM, VIDEO DISPLAY DEVICE, AND AUDIO OUTPUT DEVICE FOR SYNCHRONIZING DECODING OF VIDEO FRAMES BY THE VIDEO DISPLAY DEVICE TO DECODING OF AUDIO FRAMES BY THE AUDIO OUTPUT DEVICE

(71) Applicant: MITSUBISHI ELECTRIC CORPORATION, Tokyo (JP)

(72) Inventor: Eiji Matsuo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/422,341

(22) PCT Filed: Aug. 27, 2013

(86) PCT No.: PCT/JP2013/072840
§ 371 (c)(1),
(2) Date: Feb. 18, 2015

(87) PCT Pub. No.: WO2014/069081
PCT Pub. Date: May 8, 2014

(65) Prior Publication Data
US 2015/0215496 A1     Jul. 30, 2015

(30) Foreign Application Priority Data
Oct. 30, 2012   (JP) ................................. 2012-238693

(51) Int. Cl.
*H04N 5/04* (2006.01)
*H04N 5/06* (2006.01)
(Continued)

(52) U.S. Cl.
CPC ............... *H04N 5/06* (2013.01); *G11B 27/10* (2013.01); *H04N 5/04* (2013.01); *H04N 5/765* (2013.01);
(Continued)

(58) Field of Classification Search
CPC .... H04N 5/06; H04N 5/765; H04N 21/43637; H04N 21/4341; H04N 21/43615; G11B 27/10
See application file for complete search history.

(56) References Cited

U.S. PATENT DOCUMENTS 6,512,884 B1 *   1/2003   Sawada ................ H04N 9/8063
                                                        348/423.1
8,199,780 B2 *   6/2012   Gha ........................ H04R 5/04
                                                        370/517
(Continued)

FOREIGN PATENT DOCUMENTS

CN           101933333 A       12/2010
CN           101946518 A        1/2011
(Continued)

*Primary Examiner* — Michael Lee
*Assistant Examiner* — Humam Satti
(74) *Attorney, Agent, or Firm* — Birch, Stewart, Kolasch & Birch, LLP

(57) ABSTRACT

Audio decoding (108) is carried out in a video display device (10), and a frame number (AC) of the decoded audio is wirelessly transmitted, together with audio data, to an audio output device (20). An audio frame number (RC) is returned from the audio output device (20) to the video display device (10). The timing of video decoding (106) is controlled such that the frame number (VC) of the video decoded in the video display device (10) matches the returned audio frame number (RC). Even if it is not possible to predict the delays such as those involved with transmission from the video display device to the audio output device, and even if the (Continued)

delays fluctuate, it is possible to synchronize the video display with the audio output.

13 Claims, 14 Drawing Sheets

(51) Int. Cl.
    *H04N 21/43*     (2011.01)
    *H04N 21/436*     (2011.01)
    *H04N 21/44*     (2011.01)
    *H04N 21/434*     (2011.01)
    *H04N 21/4363*     (2011.01)
    *G11B 27/10*     (2006.01)
    *H04N 5/765*     (2006.01)

(52) U.S. Cl.
    CPC ..... *H04N 21/4307* (2013.01); *H04N 21/4341* (2013.01); *H04N 21/43615* (2013.01); *H04N 21/43637* (2013.01); *H04N 21/44004* (2013.01)

(56) References Cited

U.S. PATENT DOCUMENTS

| | | | |
|---|---|---|---|
| 2006/0024024 A1* | 2/2006 | Chen | H04N 5/04 386/211 |
| 2006/0072627 A1 | 4/2006 | Kugumiya et al. | |
| 2007/0019739 A1 | 1/2007 | Koyanagi et al. | |
| 2007/0091935 A1* | 4/2007 | Yonezawa | H04N 21/2368 370/503 |
| 2007/0250873 A1 | 10/2007 | Ohyama et al. | |
| 2008/0013512 A1 | 1/2008 | Yurugi | |
| 2008/0037151 A1* | 2/2008 | Fujimoto | G11B 20/10 360/18 |
| 2008/0304571 A1* | 12/2008 | Tsukagoshi | H04N 21/2368 375/240.25 |
| 2008/0318518 A1* | 12/2008 | Coutinho | H04H 20/62 455/3.06 |
| 2009/0091655 A1* | 4/2009 | Russell | H04N 21/2368 348/515 |
| 2009/0116814 A1* | 5/2009 | Morohashi | H04N 5/92 386/248 |
| 2009/0168903 A1 | 7/2009 | Vaquero et al. | |
| 2010/0014005 A1 | 1/2010 | Yano et al. | |
| 2010/0295992 A1 | 11/2010 | Lee et al. | |
| 2011/0069223 A1* | 3/2011 | Nishikawa | H04N 5/602 348/425.4 |
| 2012/0301121 A1* | 11/2012 | Suzuki | H04N 21/42607 386/355 |
| 2013/0058419 A1* | 3/2013 | Ye | H04N 21/43637 375/240.25 |

FOREIGN PATENT DOCUMENTS

| | | |
|---|---|---|
| JP | 2002-354419 A | 12/2002 |
| JP | 2004-282667 A | 10/2004 |
| JP | 2006-109000 A | 4/2006 |
| JP | 2007-28261 A | 2/2007 |
| JP | 2007-95163 A | 4/2007 |
| JP | 2007-96708 A | 4/2007 |
| JP | 2007-96971 A | 4/2007 |
| JP | 2007-274019 A | 10/2007 |
| JP | 2008-219818 A | 9/2008 |
| JP | 2008-219819 A | 9/2008 |
| JP | 2008-219820 A | 9/2008 |
| JP | 2008-219821 A | 9/2008 |
| JP | 2009-49919 A | 3/2009 |
| JP | 2009-89056 A | 4/2009 |
| JP | 2010-516078 A | 5/2010 |
| JP | 2011-91519 A | 5/2011 |
| JP | 2011-145783 A | 7/2011 |
| WO | WO 2006/064689 A1 | 6/2006 |
| WO | WO 2008/108352 A1 | 9/2008 |
| WO | WO 2009/157078 A1 | 12/2009 |
| WO | WO 2010/132278 A2 | 11/2010 |

* cited by examiner 11　　10　　00　　01

AUDIO/VIDEO REPRODUCTION SYSTEM, VIDEO DISPLAY DEVICE, AND AUDIO OUTPUT DEVICE FOR SYNCHRONIZING DECODING OF VIDEO FRAMES BY THE VIDEO DISPLAY DEVICE TO DECODING OF AUDIO FRAMES BY THE AUDIO OUTPUT DEVICE

TECHNICAL FIELD

The present invention relates to an audio/video reproduction system for reproducing audio and video of a content, to a video display device, and to an audio output device. The invention relates in particular to the synchronization of video display and audio output in a system including a video display device and an audio output device, in which a wireless signal representing audio is sent from the video display device to the audio output device.

BACKGROUND ART

There are known systems of this type that send an audio signal from a television set to a remote control equipped with a speaker and, in order to synchronize the audio output and the video display, predict or calculate a time Ta taken to generate a wireless communication signal in the television set, a time Tb required to send the wireless communication signal to the remote control, and a time Tc taken for the remote control to produce speaker output, and delay the display of the video in the television set by the sum Td of these times (patent references 1-4).

PRIOR ART REFERENCES

Patent References

Japanese Patent Application Publication No. 2008-219818 (paragraphs 0154 and 0162-0169)
Japanese Patent Application Publication No. 2008-219819 (paragraphs 0143, 0144, and 0151-0157)
Japanese Patent Application Publication No. 2008-219820 (paragraphs 0141 and 0149-0156)
Japanese Patent Application Publication No. 2008-219821 (paragraphs 0141 and 0149-0156)

SUMMARY OF THE INVENTION

Problems to be Solved by the Invention

A problem in the above conventional systems, however, has been that when the sum Td found from the predicted or calculated times Ta, Tb, Tc differs from the time actually required, the video display and the audio output are out of synchronization.

Means for Solving the Problem

An audio/video reproduction system according to one aspect of the invention comprises a video display device and an audio output device,
the video display device displaying video and wirelessly transmitting, to the audio output device, an audio signal representing audio to be output in synchronization with the video,
the audio output device outputting the audio represented by the audio signal, wherein
the video display device comprises:
a video data buffer for temporarily storing video data representing the video;
a video decoder for sequentially reading and decoding the video data stored in the video data buffer and outputting a video signal;
a reproduced video frame number generation unit for generating a frame number of the video decoded by the video decoder as a reproduced video frame number;
an audio data buffer for temporarily storing audio data representing the audio;
an audio decoder for sequentially reading and decoding the audio data stored in the audio data buffer and outputting the audio signal;
a reproduced audio frame number generation unit for generating a frame number of the audio decoded by the audio decoder as a reproduced audio frame number; and
a wireless transmission unit for wirelessly transmitting the audio signal output from the audio decoder and the reproduced audio frame number generated by the reproduced audio frame number generation unit in association with each other;
the audio output device comprises:
a wireless receiving unit for receiving the audio signal and the reproduced audio frame number wirelessly transmitted from the wireless transmission unit;
a reproduced audio frame number recovery unit for recovering and outputting the reproduced audio frame number received by the wireless receiving unit; and
a wireless transmission unit for wirelessly transmitting the reproduced audio frame number recovered by the reproduced audio frame number recovery unit to the video display device; and
the video display device further comprises a timing control unit for controlling timing of decoding in the video decoder so that the reproduced video frame number generated by the reproduced video frame number generation unit matches the reproduced audio frame number wirelessly transmitted from the audio output device.

An audio/video reproduction system according to another aspect of the invention comprises a video display device and an audio output device,
the video display device displaying a video and wirelessly transmitting, to the audio output device, an audio signal representing audio to be output in synchronization with the video,
the audio output device outputting the audio represented by the audio signal, wherein
the video display device comprises:
a video data buffer for temporarily storing video data representing the video;
a video decoder for sequentially reading and decoding the video data stored in the video data buffer and outputting a video signal;
a reference time generation unit for generating reference time information for video decoding in the video decoder; and
a wireless transmission unit for wirelessly transmitting the reference time information and audio data representing the audio to the audio output device; and
the audio output device comprises:
a wireless receiving unit for receiving the wirelessly transmitted audio data and the reference time information;
an audio data buffer for temporarily storing the audio data received by the wireless receiving unit;
an audio decoder for sequentially reading and decoding the audio data stored in the audio data buffer and outputting the audio signal;

a reference time generation unit for generating reference time information for audio decoding in the audio decoder; and a time generation control unit for controlling the reference time generation unit so that the reference time information generated by the reference time generation unit matches the reference time information received by the wireless receiving unit.

Effects of the Invention

According to the present invention, video display and audio output can be synchronized even without being able to predict the delays involved with transmission from the video display device to the audio output device, and even if the delays fluctuate.

MODE FOR CARRYING OUT THE INVENTION

First Embodiment

Figure 1:
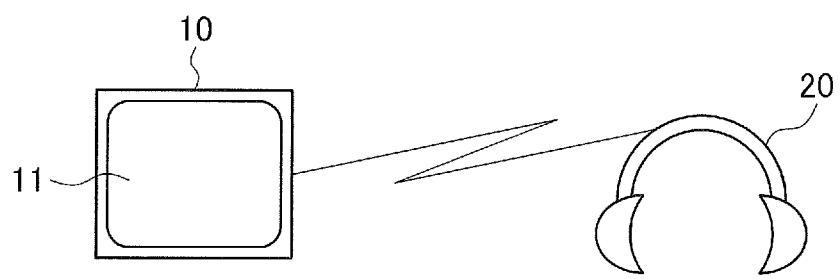
FIG. 1 is a schematic diagram illustrating the audio/video reproduction system according to the present invention.

FIG. 1 shows an audio/video reproduction system according to the present invention.

The illustrated audio/video reproduction system includes a television set 10 used as an audio transmission device or a video display device, and a headphone 20 used as an audio receiving device or an audio output device.

In the system in FIG. 1, a television broadcast, for example, is viewed and listened to when it is received by the television set 10, video is displayed on a display screen 11, and audio is output through the headphone 20. An audio signal is wirelessly transmitted from the television set 10 to the headphone 20.

Figure 2:
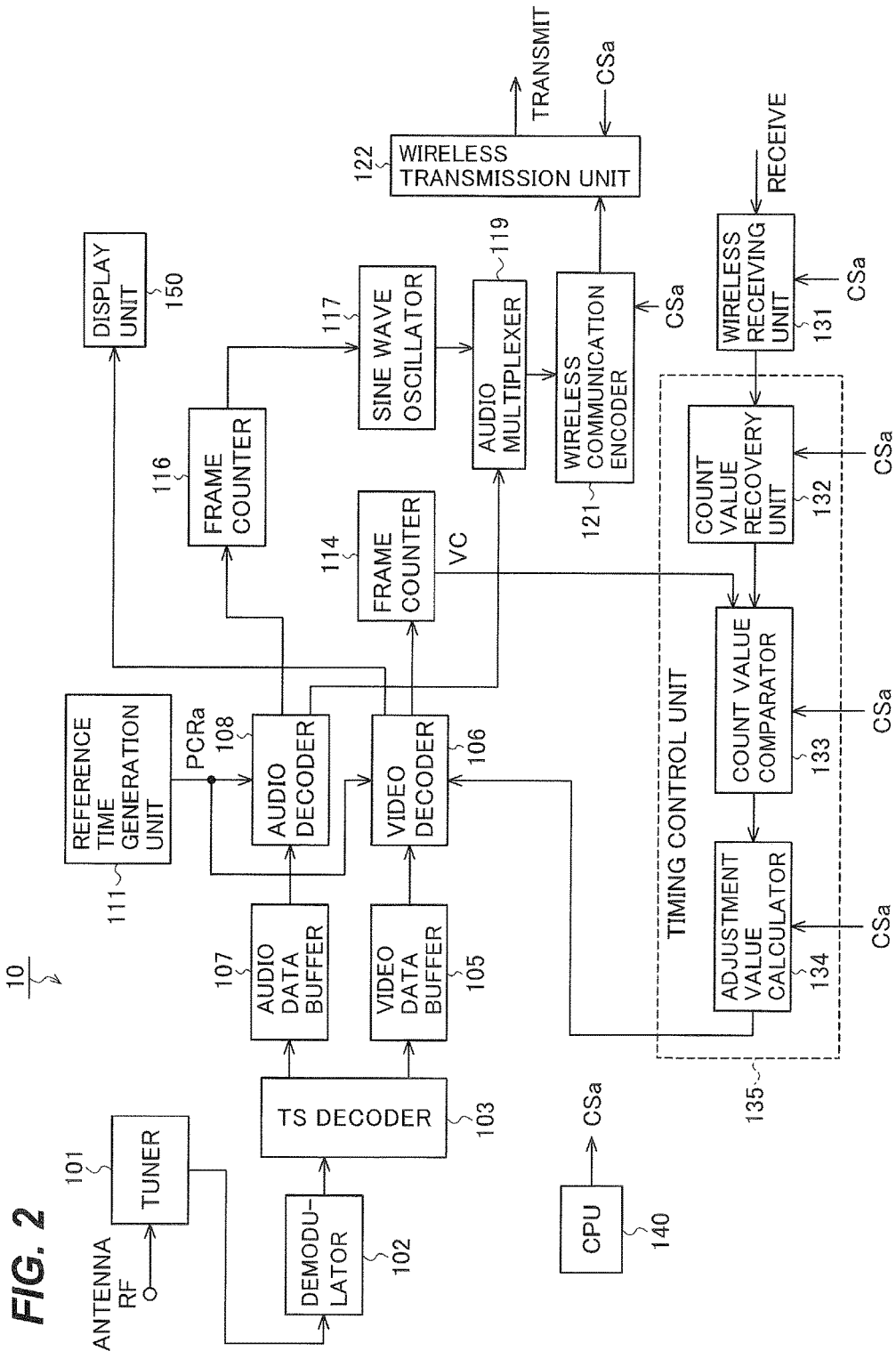
FIG. 2 is a block diagram showing an example of the configuration of a television set used in a first embodiment of the invention.

FIG. 2 shows an example of the television set 10 in FIG. 1. The illustrated television set 10 includes a video output device 100 and a display unit 150. The video output device 100 includes a tuner 101, a demodulator 102, a TS decoder 103, a video data buffer 105, a video decoder 106, an audio data buffer 107, an audio decoder 108, a reference time generation unit 111, a frame counter 114, a frame counter 116, a sine wave oscillator 117, an audio multiplexer 119, a wireless communication encoder 121, a wireless transmission unit 122, a wireless receiving unit 131, a count value recovery unit 132, a count value comparator 133, an adjustment value calculator 134, and a CPU 140.

From among the digital broadcast signals input to the television set 10, the tuner 101 selects and outputs the broadcast signal of a designated channel.

The demodulator 102 demodulates the digital broadcast signal selected by the tuner 101 to generate a demodulated signal. The digital broadcast signal may be, for example, an MPEG-TS with audio and video multiplexed for simultaneous reproduction (audio and video of the same content).

The TS decoder 103 decodes the demodulated signal generated by the demodulator 102 and separates it into audio data and video data. The audio data and video data include timestamps indicating decoding start times and timestamps indicating output start times.

A timestamp indicating a decoding start time is referred to as a DTS (Decoding Time Stamp), and a timestamp indicating an output start time stamp is referred to as a PTS (Presentation Time Stamp).

Because of the addition of DTS and PTS timestamps to the audio and video data, in general, decoding of the audio and video data can start at a time indicated by a DTS, and the video can be displayed and the audio can be output at times indicated by a PTS, so that the video display and audio output can be synchronized. Even when this is done, however, since the audio/video reproduction system of the invention has a configuration in which the audio signal is wirelessly transmitted from the television set 10 that performs video display to the headphone 20 that performs audio output, deviations arise between the video display and audio output. The purpose of the present invention is to eliminate such deviations.

The video data buffer 105 temporarily stores the video data. The video decoder 106 sequentially reads and decodes the video data stored in the video data buffer 105, and outputs a video signal to the display unit 150. The display unit 150 displays video on the display screen (indicated by reference character 11 in FIG. 1).

The audio data buffer 107 temporarily stores the audio data. The audio decoder 108 sequentially reads and decodes the audio data stored in the audio data buffer 107, and outputs the audio signal.

The reference time generation unit 111 generates a reference clock and reference time information for video decoding by the video decoder 106 and audio decoding by the audio decoder 108.

The reference time generation unit 111 is controlled so as to be synchronized with a PCR (Program Clock Reference) added to the data of the broadcast content. Accordingly, the reference time information PCRa generated by the reference time generation unit 111 is synchronized with the PCR added to the broadcast content.

The timings of video data decoding and video output by the video decoder 106 are controlled according to the reference clock, the reference time information PCRa, and the DTS and PTS added to the video data. That is, they are controlled so that decoding and output (display) of the video are performed when the reference time information PCRa generated by the reference time generation unit 111 reaches values matching the values of the DTS and PTS added to the video data in each frame.

The timings of audio data decoding and audio signal output by the audio decoder 108 are controlled according to the reference clock, the reference time information PCRa output from the reference time generation unit 111, and the DTS and PTS added to the audio data. That is, they are controlled so that decoding and output of the audio (output of the audio signal from the audio decoder 108) are performed when the reference time information PCRa generated by the reference time generation unit 111 reaches values matching the values of the DTS and PTS added to the audio data in each frame (the audio data corresponding to the video in each frame).

The CPU 140 performs software computational processing, and software control of the entire television set 10. Control signals from the CPU 140 to the various components are indicated by reference characters CSa.

The above processing blocks are also normally included in conventional television sets 10. The processing blocks described below are added in the present invention for synchronization between video display and audio output.

The frame counter 114 counts video frames decoded by the video decoder 106 and outputs the count value as (information indicating) the video frame number VC.

The frame counter 116 counts audio frames (the video frames corresponding to the audio, that is, the video frames that should be displayed at the same time as the audio output) decoded by the audio decoder 108, and outputs the count value as (information indicating) the audio frame number AC.

Since the DTS and PTS are added to both the video data and audio data as described above, it is possible to count the video frames on the basis of the DTS and PTS added to the video data and count the audio frames on the basis of the DTS and PTS added to the audio data.

As described below, in this system, when the video display and audio output are synchronized, the frame number AC of the audio decoded by the audio decoder 108 is smaller than the frame number VC of the video decoded simultaneously by the video decoder 106, that is, it indicates the audio that should be output earlier, and the number of frames of video data stored in the video data buffer 105 is greater than the number of video frames corresponding to the audio of the audio data stored in the audio data buffer 107.

As described above, the frame count value given by the frame counter 114 indicates the frame number of the decoded video and is also referred to as the reproduced video frame number in this application, and accordingly, the frame counter 114 may also be referred to as the reproduced video frame number generation unit.

Similarly, the count value given by the frame counter 116 indicates the frame number of the decoded audio and is also referred to as the reproduced audio frame number in this application, and accordingly, the frame counter 116 may also be referred to as the reproduced audio frame number generation unit.

The sine wave oscillator 117 generates a sine wave signal with a frequency corresponding to the frame count value AC given by the frame counter 116. The frequency of the sine wave signal is within the audio band, more particularly within the frequency range of the audio signal processed by the audio decoder 108, and changes every time the frame count value AC changes (increments).

The frame counter 116 counts up from a prescribed lower limit value, such as zero, for example, to a prescribed upper limit value, and when it reaches the upper limit value, it is reset to zero, after which the count-up and reset process repeats, which means that the count value varies cyclically within the range from the lower limit value to the upper limit value. In one example, the count value given by the frame counter 116 is expressed by 16 bits, the lower limit value is 0, and the upper limit value is 65535.

The frequencies associated with the count values are pre-stored in the sine wave oscillator 117, which oscillates at, for example, a frequency of 100 Hz for a count value of 0 and a frequency of 10 kHz for a count value of 65535. For the count values between 0 and 65535, the frequency increases by (10 kHz−100 Hz)/65535=0.15 Hz every time the count value increases by 1.

Since the frequencies associated with the count values are within the audio band, more particularly, within the frequency range of the audio processed by the audio decoder 108, they can be wirelessly transmitted in the same way as the audio decoded by the audio decoder 108.

When the audio signal is a multichannel audio signal, the count value may be divided and assigned to the multiple channels. If there are two audio channels, a first channel and a second channel, for example, the first half (0 to 32767) of the count value may be assigned to the frequencies from 100 Hz to 10 kHz in the first channel, and the latter half (32768 to 65535) may be assigned to the frequencies from 100 kHz to 10 kHz in the second channel. It is also possible to transmit signals with a frequency corresponding to the same count value on the multiple channels and have them checked at the receiving end to confirm that they agree.

The audio multiplexer 119 multiplexes the audio signal output from the audio decoder 108 and the sine wave generated by the sine wave oscillator 117.

In order to wirelessly transmit the audio, the wireless communication encoder 121 samples and encodes the multiplexed audio signal (an analog audio signal), thereby generating a digital data stream. This encoding is performed by PCM, for example, by ADPCM.

The wireless transmission unit 122 wirelessly transmits the digital data stream generated by the wireless communication encoder 121.

A short-range wireless transmission system, such as Bluetooth (registered trademark), for example, may be used for wireless communication.

Figure 3:
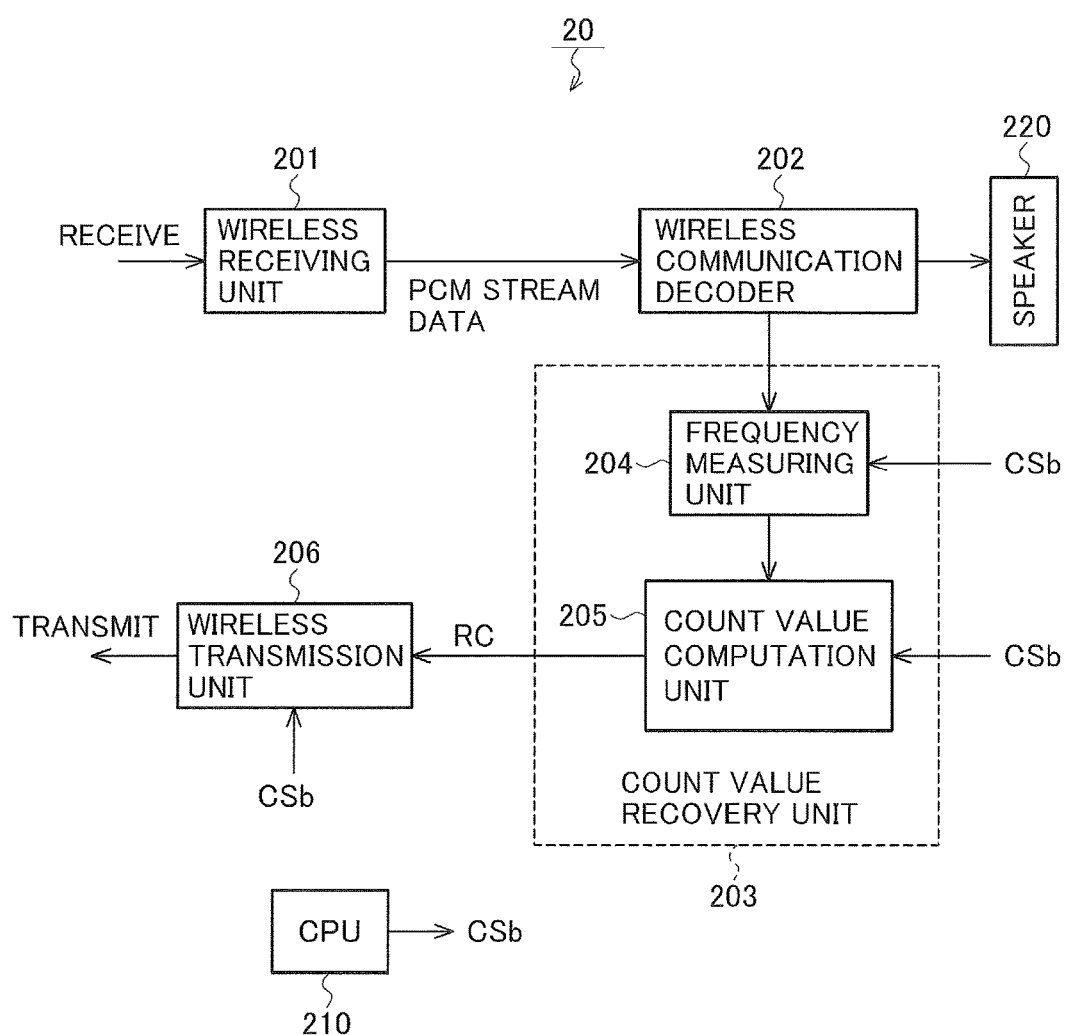
FIG. 3 is a block diagram showing an example of the configuration of a headphone used in the first embodiment of the invention.

FIG. 3 shows an example of the headphone 20 in FIG. 1.

The illustrated headphone 20 includes a wireless receiving unit 201, a wireless communication decoder 202, a count value recovery unit 203, a wireless transmission unit 206, a CPU 210, and a speaker 220.

The wireless receiving unit 201 receives and outputs the digital data stream wirelessly transmitted from the wireless transmission unit 122 in the television set 10.

The wireless communication decoder 202 decodes the digital data stream (e.g., PCM encoded data) received at the wireless receiving unit 201, recovers the multiplexed audio signal, then separates it into the original audio signal (the signal indicating the audio of the broadcast content) and the sine wave indicating the frame count value AC, and outputs them.

The audio signal decoded and separated by the wireless communication decoder 202 is supplied to the speaker 220, from which the audio is output.

The count value recovery unit 203 recovers the frame count value from the sine wave signal output from the wireless communication decoder 202. The recovered count value is represented by reference characters RC. The count value RC indicates the frame number of the reproduced audio, so that the count value recovery unit 203 may also be referred to as the reproduced audio frame number recovery unit.

The count value recovery unit 203 has a frequency measuring unit 204 and a count value computation unit 205.

The frequency measuring unit 204 measures a frequency from the sine wave signal output from the wireless communication decoder 202 and generates frequency data.

The count value computation unit 205 calculates a frame count value by performing a computation from the frequency measured by the frequency measuring unit 204.

The frame count value calculated by the count value computation unit 205 is used as a recovered frame count value RC.

The recovered frame count value RC (when the wireless communication and recovery processes, etc., have been performed without error) indicates the same value as the transmitted frame count value AC, and represents the frame number of the audio being output from the headphone 20 at that time.

When the count value is divided and assigned to multiple audio channels, recovery of the frame count value RC is also based on the channel in which the sine wave signal is included.

When sine waves corresponding to the same count value are transmitted on multiple audio channels, a comparison may be performed across the multiple channels. If they all match, the recovered count value can be treated as highly reliable. If they do not match, the recovered count value can be treated as having low reliability.

The wireless transmission unit 206 transmits a wireless signal indicating the count value RC recovered by the count value recovery unit 203.

The CPU 210 performs software computational processing, and software control of the entire headphone 20. Control signals from the CPU 210 to the various components are indicated by reference characters CSb.

Returning to FIG. 2, the wireless receiving unit 131 in the television set 10 receives the signal indicating the frame count value RC wirelessly transmitted from the headphone 20.

The count value recovery unit 132 generates (reproduces) the recovered frame count value RC on the basis of the signal received by the wireless receiving unit 131, indicating the recovered frame count value RC.

The count value comparator 133 calculates the difference (dC=VC−RC) between the frame count value VC of the frame counter 114 and the frame count value RC output from the count value recovery unit 132. The count value comparator 133 may also be referred to as a frame number comparator.

The difference dC found between the frame count values by the count value comparator 133 indicates the deviation between the timings of video display on the television set 10 and audio output from the headphone 20. This is assuming that the time needed to transmit the signal indicating the frame count value RC from the headphone 20 to the television set 10 can be neglected.

The adjustment value calculator 134 calculates an adjustment value dTS from the calculated difference value dC.

The video decoder 106 changes the video decoding timing by the adjustment value dTS calculated by the adjustment value calculator 134. If the adjustment value dTS is positive, the decoding timing is delayed. For example, instead of performing the decoding and output of the video stamped with the DTS and PTS matching the reference time PCRa generated by the reference time generation unit 111, it performs the decoding and output of the video stamped with the DTS and PTS matching the value (PCRa−dTS) obtained by subtracting the adjustment value from the reference time PCRa.

The above processing enables the decoding timing of the video (frame) to be delayed by the adjustment value dTS.

The adjustment value dTS may be a value proportional to the difference value dC, but an upper limit may be set for the adjustment value dTS, or an adjustment value dTS equivalent to the value obtained by multiplying the difference value dC by a value smaller than 1 may be generated. Abruptly delaying the video to be decoded, for example, creates an unnatural impression. Setting an upper limit on the adjustment value dTS as described above can prevent or mitigate the occurrence of such unnaturalness.

The amount of data accumulated in the video data buffer 105 increases by the amount by which the start of video decoding is delayed.

The count value recovery unit 132, the count value comparator 133, and the adjustment value calculator 134 constitute a timing control unit 135 for controlling the timing of decoding by the video decoder 106 so that the frame count value VC generated by the frame counter 114 matches the frame count value RC wirelessly transmitted from the headphone 20.

The above synchronization processes, that is, the generation of a sine wave by the sine wave oscillator 117, the recovery of the count value RC by the count value recovery unit 203, the transmitting and receiving of the count value RC by the wireless transmission unit 206 and the wireless receiving unit 201, and the control of the video decoder 106 by the timing control unit 135 may be performed at regular time intervals, or the time interval may be varied on the basis of the difference dC. In this case, the time interval may be shortened as the difference dC increases. Such control over the timing is performed by the CPU 140.

In the system in FIG. 1, video is displayed immediately after being decoded by the video decoder 106 in the television set 10, while audio is output after being decoded by the audio decoder 108 in the television set 10, processed by the audio multiplexer 119 and the wireless communication encoder 121, and then transmitted to the headphone 20 and decoded by the wireless communication decoder 202. Accordingly, if the video decoded by the video decoder 106 and the audio simultaneously decoded by the audio decoder 108 belong to the same frame, the audio output at the headphone 20 lags the video display.

In this embodiment, a reproduced audio frame number AC indicating the frame number of the audio decoded by the audio decoder 108 is generated in the television set 10 and transmitted to the headphone 20, the reproduced audio frame number is recovered in the headphone 20, the recovered reproduced audio frame number RC is transmitted from the headphone 20 to the television set 10 as information indicating the frame number of the audio being output from the headphone 20, and in the television set 10, the decoding timing in the video decoder 106 is controlled to make the reproduced video frame number VC match the reproduced audio frame number RC. The result of performing this type of loop control (feedback control) is that even if the audio lags (the video leads) as described above at the start of the reproduction, the lag (video lead) is gradually reduced, until finally the timings of audio output and video display agree.

Second Embodiment

In the first embodiment, the frame count value AC is converted to a sine wave of a corresponding frequency and transmitted, but the frame count value AC may be digitally modulated and transmitted in the audio band.

Figure 4:
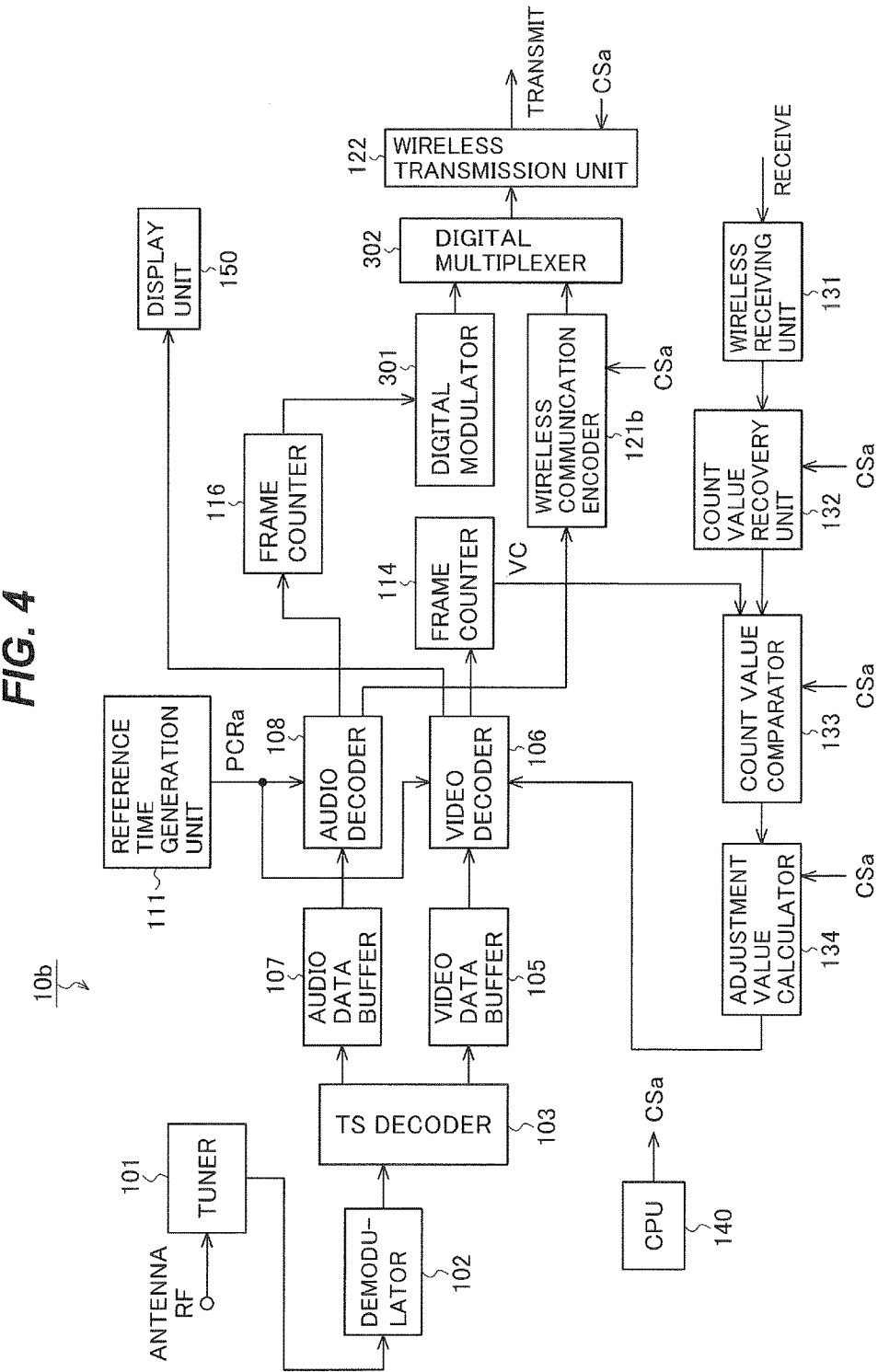
FIG. 4 is a block diagram showing an example of the configuration of a television set used in a second embodiment of the invention.
Figure 5:
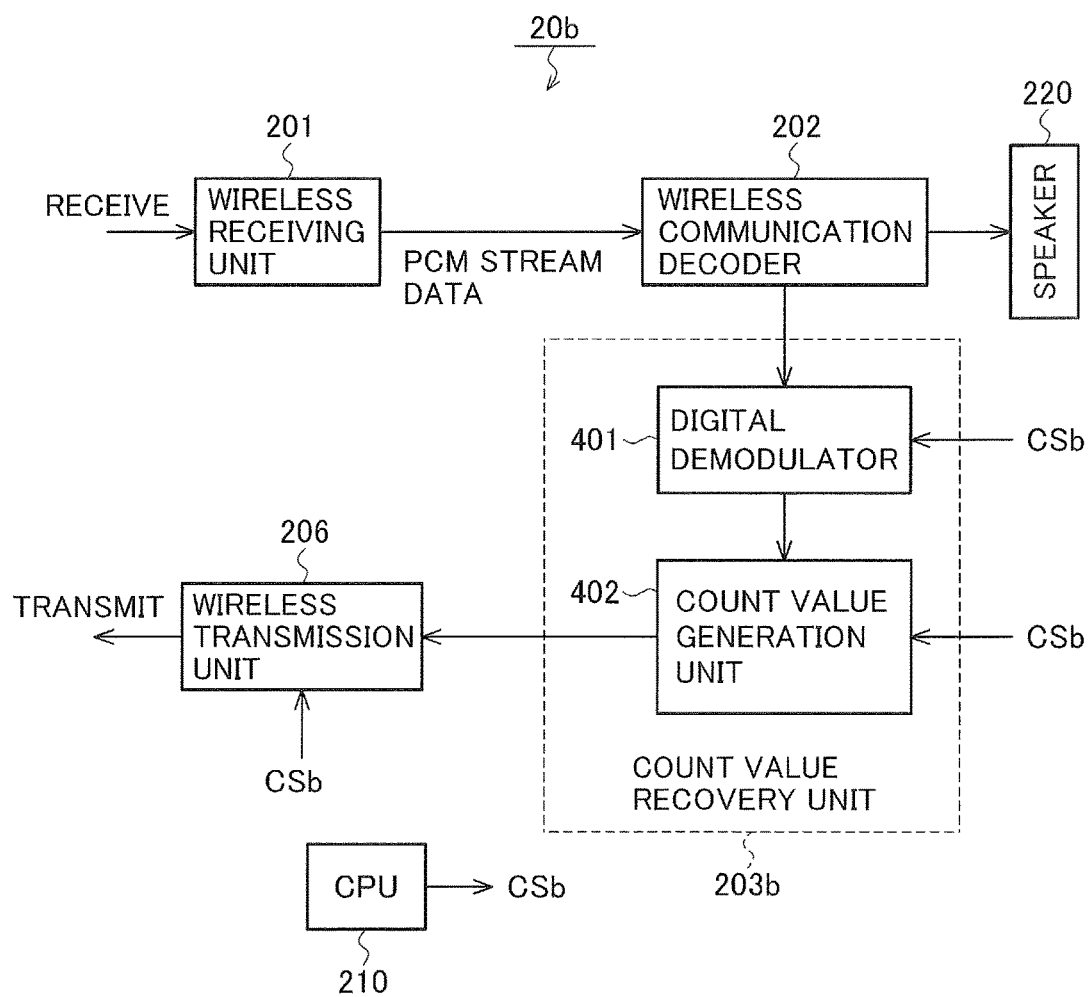
FIG. 5 is a block diagram showing an example of the configuration of a headphone used in the second embodiment of the invention.

FIGS. 4 and 5 show a television set 10b used as a video display device and a headphone 20b used as an audio output device in a second embodiment of the invention.

The television set 10b shown in FIG. 4 is generally the same as the set in FIG. 2, but the sine wave oscillator 117 and the audio multiplexer 119 in FIG. 2 are not provided, and a digital modulator 301 and a digital multiplexer 302 are provided instead. In addition, the wireless communication encoder 121 in FIG. 2 is replaced with a wireless communication encoder 121b.

The digital modulator 301 digitally modulates the output (the frame count value AC) of the frame counter 116.

The wireless communication encoder 121b samples and encodes the output (audio signal) from the audio decoder 108 to generate a digital data stream. The encoding is performed by PCM, for example, by ADPCM.

The digital multiplexer 302 multiplexes the output (the digital data stream obtained by encoding of the audio signal) of the wireless communication encoder 121b and the output (the data obtained by digital modulation of the frame count value AC) of the digital modulator 301.

The wireless transmission unit 122 wirelessly transmits the output of the digital multiplexer 302.

The headphone 20b shown in FIG. 5 is generally the same as the headphone 20 in FIG. 3, but the count value recovery unit 203 in FIG. 3 is replaced with a count value recovery unit 203b.

The wireless receiving unit 201 receives and outputs the digital data stream wirelessly transmitted from the television set 10b.

The wireless communication decoder 202 decodes the digital data stream received by the wireless receiving unit 201, recovers the audio signal, and then separates it into an original audio signal (representing the audio of the broadcast content) and digital data indicating the frame count value AC, and outputs them.

The audio signal decoded and separated by the wireless communication decoder 202 is supplied to the speaker 220, from which audio is output.

The count value recovery unit 203b recovers the data indicating the frame count value from the digital data indicating the count value AC separated by the wireless communication decoder 202. The recovered count value is represented by reference characters RC.

The recovered count value RC indicates the frame number of the audio that is being decoded by the wireless communication decoder 202 and output from the headphone 20b.

The count value recovery unit 203b includes a digital demodulator 401 and a count value generation unit 402.

The digital demodulator 401 digitally demodulates the data indicating the count value AC separated by the wireless communication decoder 202.

The count value generation unit 402 generates a frame count value from the output (data obtained by demodulation) of the digital demodulator 401.

The frame count value generated by the count value generation unit 402 is used as the recovered frame count value RC.

The signal indicating the recovered frame count value RC is wirelessly transmitted by the wireless transmission unit 206 to the television set 10b.

Regarding points other than the above, the second embodiment operates in the same way as the first embodiment.

The same loop control as in the first embodiment is also performed in the configuration in the second embodiment, with the result that the video display and audio output can be synchronized. Since the reproduced audio frame number is digitally modulated and transmitted from the television set to the headphone, data errors can be reduced, and highly accurate control can be performed.

Specific examples of the digital modulator 301 and the digital demodulator 401 in the second embodiment are shown below.

Figure 6A:
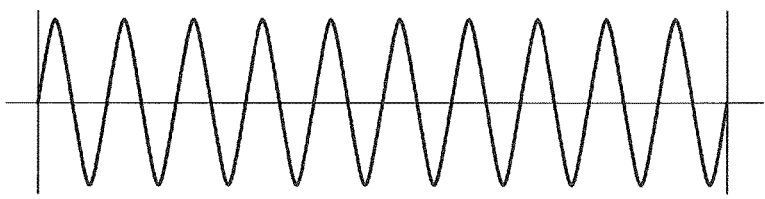
FIGS. 6(a) and 6(b) are diagrams showing waveforms of a carrier wave and a modulated wave when ASK modulation is performed, as an example of digital modulation in the second embodiment.
Figure 6B:
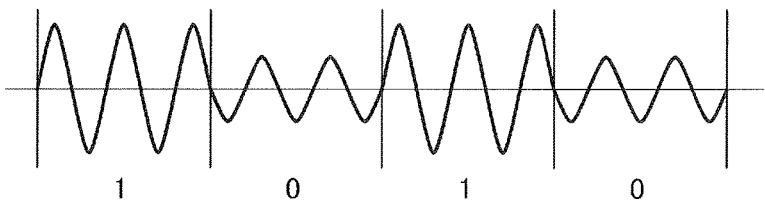

FIGS. 6(a) and 6(b) show waveforms when amplitude shift keying modulation (ASK modulation) is performed, as one example of digital modulation. ASK modulation modulates a carrier wave (FIG. 6(a)) by assigning different amplitudes to the values 1 and 0 in the digital data, thereby generating a modulated wave (FIG. 6(b)).

Figure 7A:
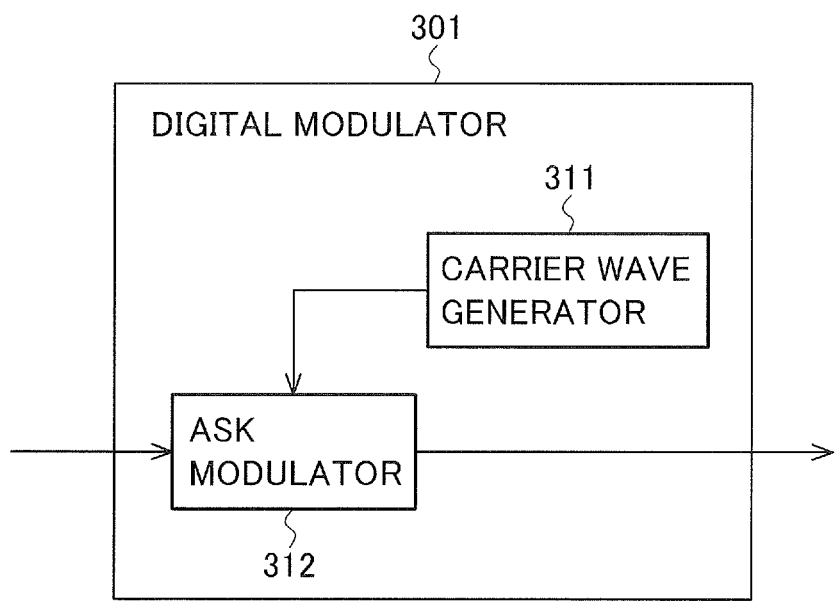
FIGS. 7(a) and 7(b) are block diagrams showing examples of the configuration of the modulator and demodulator used when ASK modulation is performed.
Figure 7B:
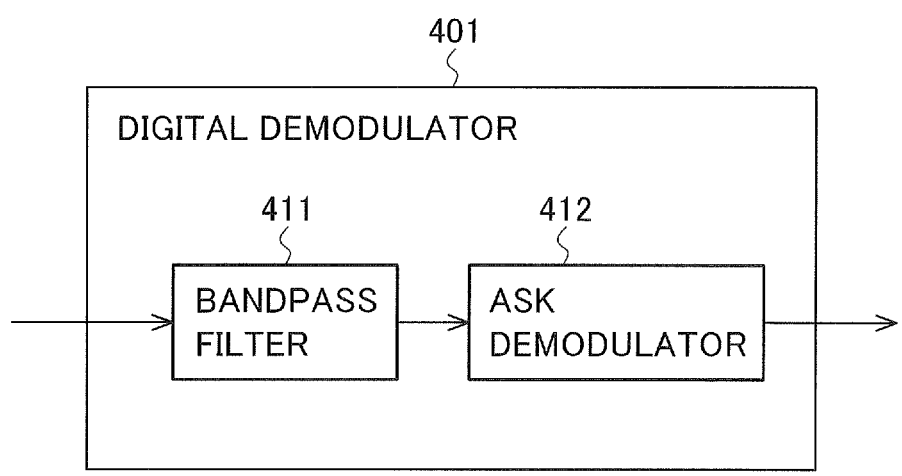

When ASK modulation is performed, the configurations shown in FIGS. 7(a) and 7(b) are used for the digital modulator 301 and the digital demodulator 401, respectively.

The digital modulator 301 shown in FIG. 7(a) includes a carrier wave generator 311 for generating a carrier wave with a prescribed frequency and an ASK modulator 312 for performing ASK modulation of the carrier wave generated by the carrier wave generator 311. The digital demodulator 401 shown in FIG. 7(b) includes a bandpass filter 411 for rejecting frequency components other than those in the carrier band and an ASK demodulator 412 for ASK-demodulating the signal that has been band-limited by the bandpass filter 411.

If the digital modulation is performed by ASK modulation as described above, the reproduced audio frame number can be transmitted from the television set 10b to the headphone 20b by a method with high noise immunity and few errors.

Figure 8A:
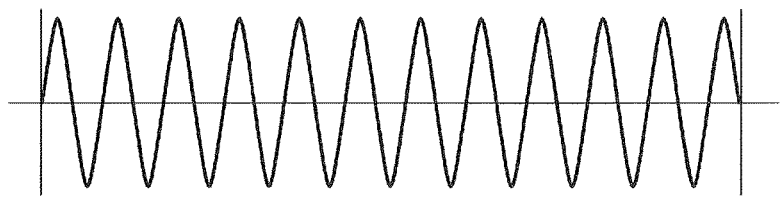
FIGS. 8(a) and 8(b) are diagrams showing waveforms of a carrier wave and a modulated wave when FSK modulation is performed, as another example of digital modulation in the second embodiment.
Figure 8B:
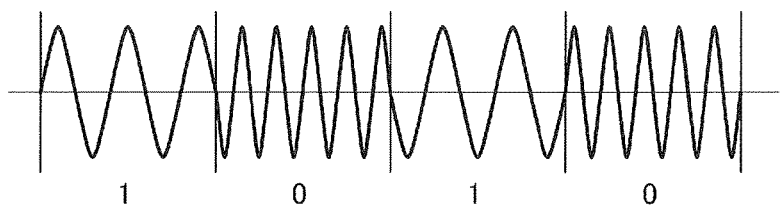

FIGS. 8(a) and 8(b) show waveforms when frequency shift keying (FSK) modulation is performed, as another example of digital modulation. FSK modulation modulates the carrier wave (FIG. 8(a)) by assigning different frequencies to the values 1 and 0 in the digital data, thereby generating a modulated signal (FIG. 8(b)).

Figure 9A:
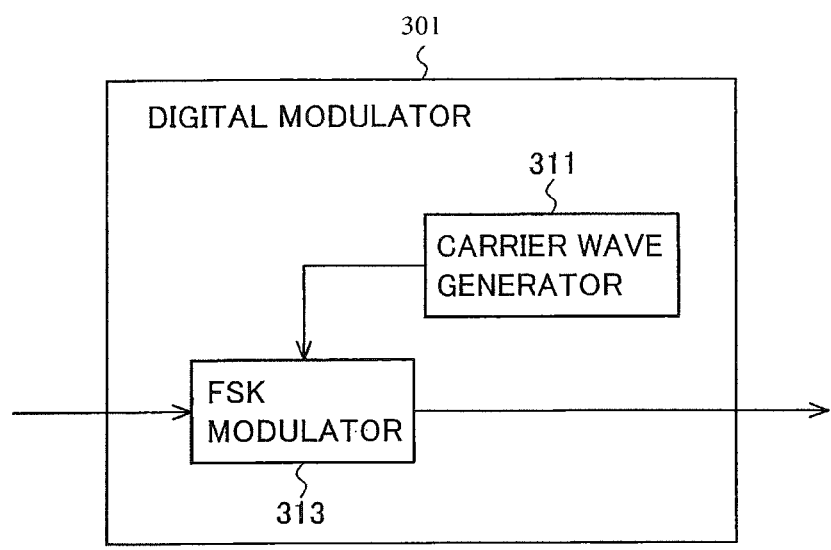
FIGS. 9(a) and 9(b) are block diagrams showing examples of the configuration of the modulator and demodulator used when FSK modulation is performed.
Figure 9B:
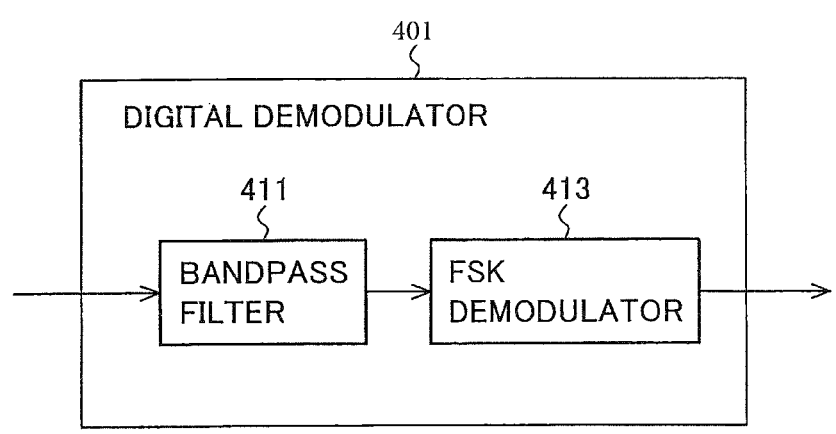

When FSK modulation is performed, the configurations shown in FIGS. 9(a) and 9(b) are used for the digital modulator 301 and the digital demodulator 401, respectively.

The digital modulator 301 shown in FIG. 9(a) includes a carrier wave generator 311 for generating a carrier wave with a prescribed frequency and an FSK modulator 313 for performing FSK modulation of the carrier wave generated by the carrier wave generator 311. The digital demodulator 401 shown in FIG. 9(b) includes a bandpass filter 411 for rejecting frequency components other than those in the carrier band and an FSK demodulator 413 for FSK demodulation of the signal that has been band-limited by the bandpass filter 411.

If the digital modulation is performed by FSK modulation as described above, the reproduced audio frame numbers can be transmitted from the television set 10b to the headphone 20b by a method with few errors.

Figure 10A:
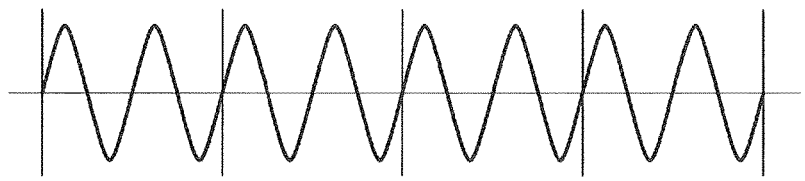
FIGS. 10(a) and 10(b) are diagrams showing waveforms of a carrier wave and a modulated wave when QPSK modulation is performed, as yet another example of digital modulation in the second embodiment.
Figure 10B:
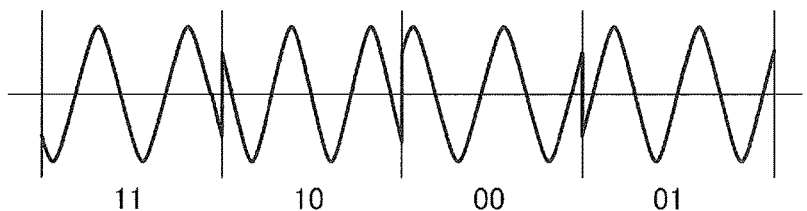
Figure 11:
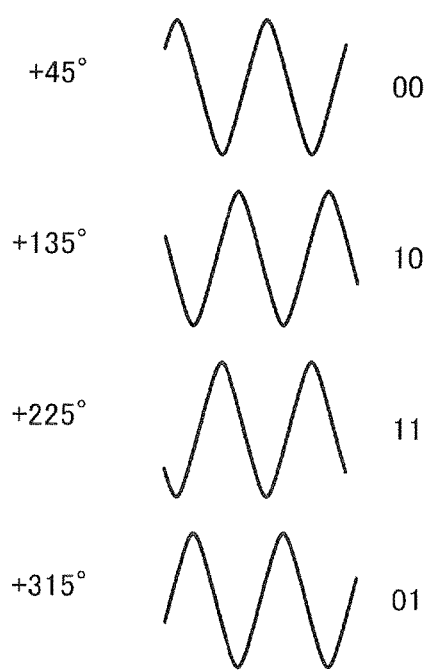
FIG. 11 is a diagram showing waveforms with different phases assigned to four digital data values when QPSK modulation is performed.
Figure 12:
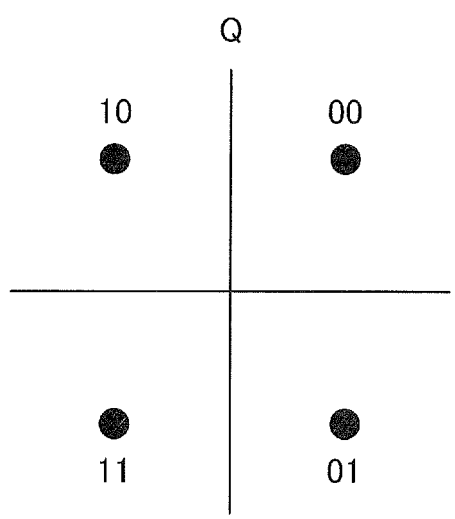
FIG. 12 is a diagram showing the different phases assigned to the four digital data values when QPSK modulation is performed.

FIGS. 10(a) and 10(b) show waveforms when phase shift keying (PSK) modulation, for example, quadrature phase shift keying (QPSK) modulation is performed, as yet another example of digital modulation. QPSK modulation modulates a carrier wave (FIG. 10(a)) by assigning different phases to the values 00, 10, 11, 01 in the digital data, thereby generating a modulated signal (FIG. 10(b)). The phases are related to the digital data 00, 10, 11, 01 as shown in FIGS. 11 and 12.

Figure 13A:
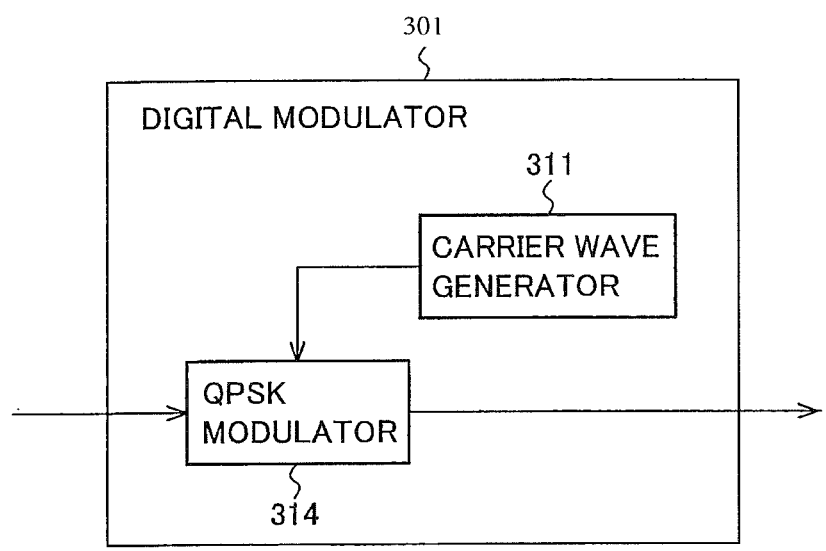
FIGS. 13(a) and 13(b) are block diagrams showing examples of the configuration of the modulator and demodulator used when QPSK modulation is performed.
Figure 13B:
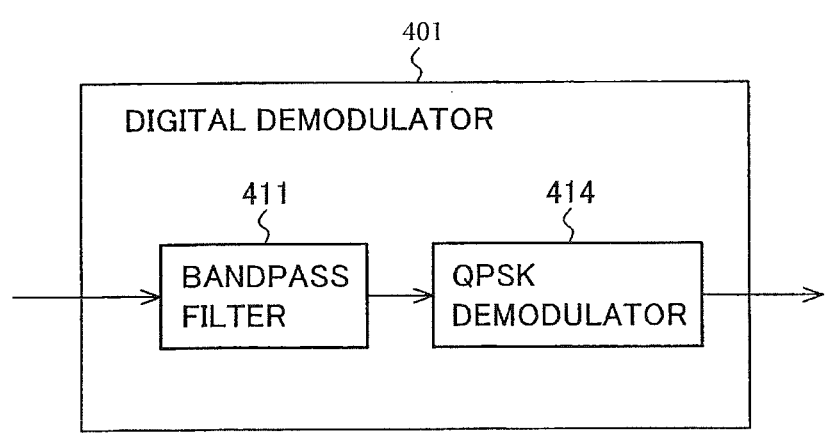

When QPSK modulation is performed, the configurations shown in FIGS. 13(a) and 13(b) are used for the digital modulator 301 and the digital demodulator 401, respectively.

The digital modulator 301 shown in FIG. 13(a) includes a carrier wave generator 311 for generating a carrier wave with a prescribed frequency and a QPSK modulator 314 for performing QPSK modulation of the carrier wave generated by the carrier wave generator 311. The digital demodulator 401 shown in FIG. 13(b) includes a bandpass filter 411 for rejecting frequency components other than those in the carrier band and a QPSK demodulator 414 for QPSK demodulation of the signal that has been band-limited by the bandpass filter 411.

As phase modulation schemes other than quadrature phase shift keying modulation, phase shift keying modulation schemes with other numbers of phases may be used, such as binary phase-shift keying (BPSK) modulation or 8-ary phase-shift keying (8-PSK) modulation, for example.

If the digital modulation is performed by PSK modulation as described above, the reproduced audio frame number can be transmitted from the television set 10b to the headphone 20b by a method with high transmission efficiency and few errors.

In addition, instead of the above schemes, a QAM system may be used in which the amplitudes of sine waveforms differing in phase by 90 degrees are varied and the two waveforms are quadrature two-phase modulated.

If the digital modulation is performed by the QAM system described above, the reproduced audio frame number can be transmitted from the television set 10b to the headphone 20b by a method with few errors.

Third Embodiment

Figure 14:
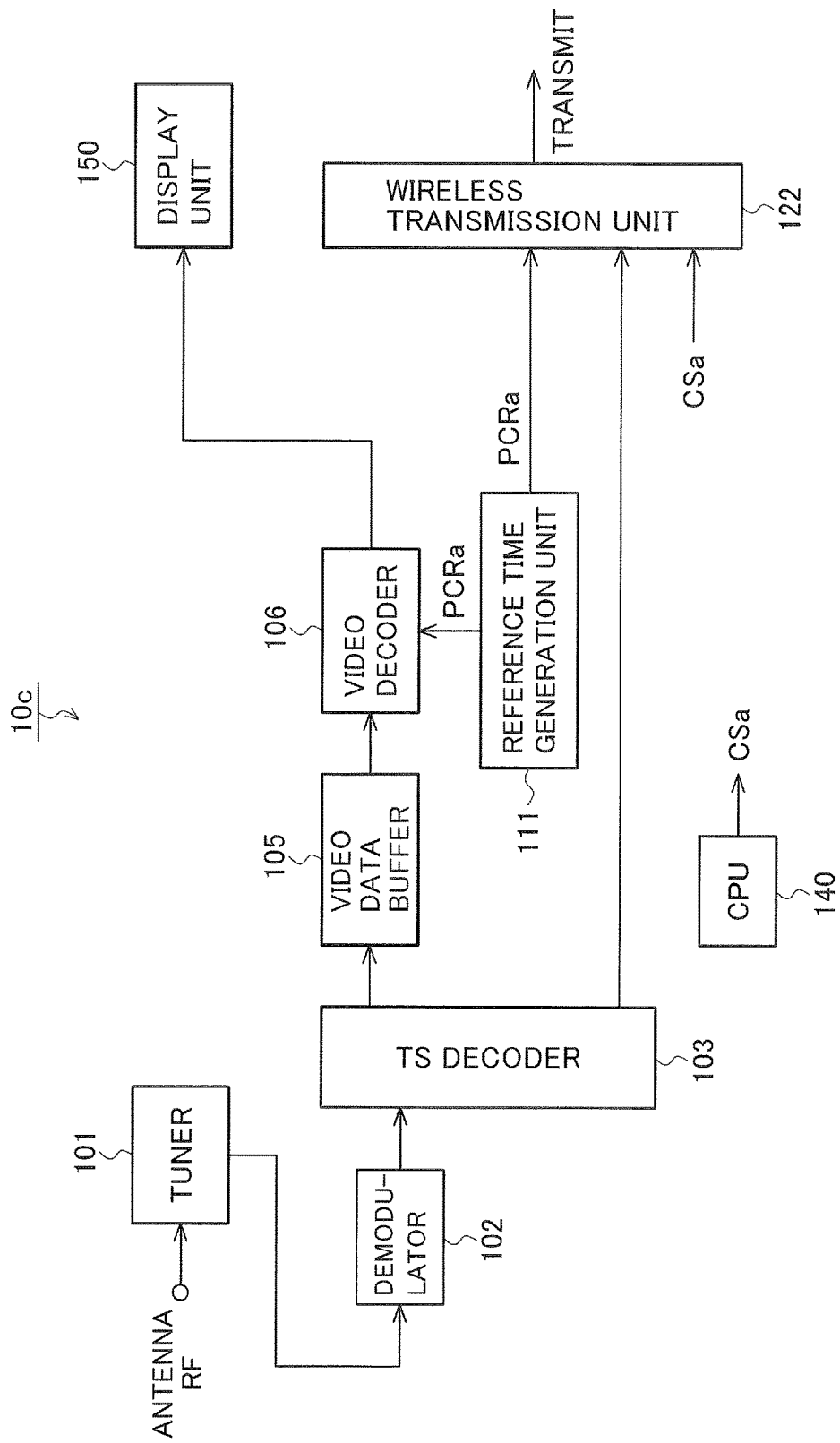
FIG. 14 is a block diagram showing an example of the configuration of a television set used in a third embodiment of the invention.
Figure 15:
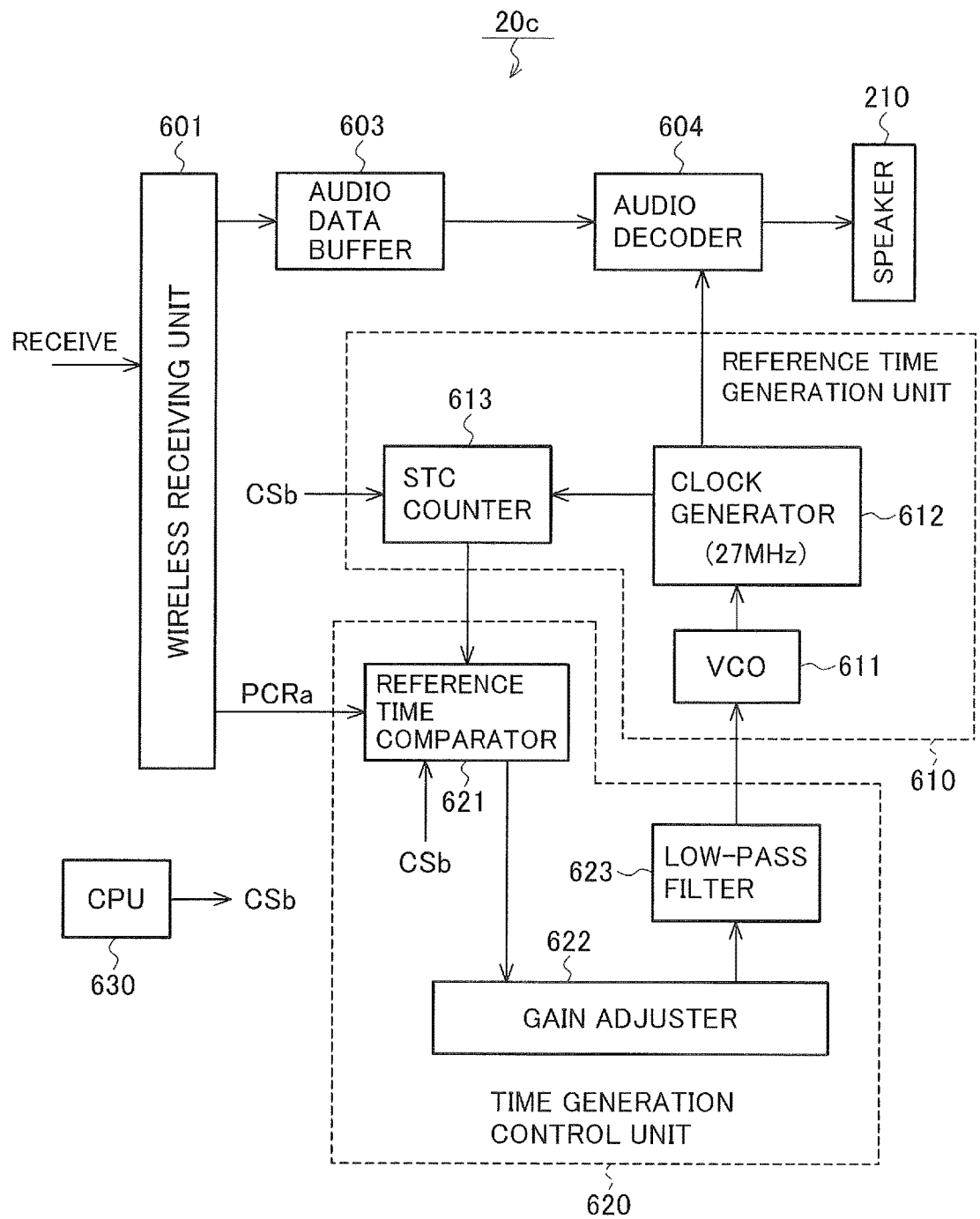
FIG. 15 is a block diagram showing an example of the configuration of a headphone used in the third embodiment of the invention.

FIGS. 14 and 15 show a television set 10c used as a video display device and a headphone 20c used as an audio output device in a third embodiment.

The television set 10c shown in FIG. 14 is generally the same as the set in FIG. 2, but the audio data buffer 107, the audio decoder 108, the frame counter 116, the sine wave oscillator 117, the audio multiplexer 119, the wireless communication encoder 121, the wireless receiving unit 131, the count value recovery unit 132, the count value comparator 133, and the adjustment value calculator 134 in FIG. 2 are not present.

The headphone 20c shown in FIG. 15 includes a wireless receiving unit 601, an audio data buffer 603, a reference time generation unit 610, a time generation control unit 620, a reference time comparator 621, a gain adjuster 622, a low-pass filter 623, and a CPU 630.

The reference time generation unit 610 includes a voltage controlled oscillator (VCO) 611, a clock generator 612, and an STC counter 613.

The time generation control unit 620 includes the reference time comparator 621, the gain adjuster 622, and the low-pass filter 623.

Reference characters in FIG. 14 that are the same as in FIG. 2 indicate like components.

At the start of operation, the video decoder 106 in FIG. 14 is preferably controlled so as to start decoding after at least a certain amount of data has accumulated in the video data buffer 105. This is done to enable the lag to be made up (by advancing the video display) in case the video display on the television set 10c lags the audio output from the headphone 20c. The capacity of the video data buffer 105 is preferably equal to or greater than the amount corresponding to the maximum anticipated delay.

In FIG. 2, the audio data separated by the TS decoder 103 are decoded in the television set, but in FIG. 14, the audio data separated by the TS decoder 103 are wirelessly transmitted in their compressed form by the wireless transmission unit 122. The audio data are stamped with a DTS and PTS as described in the first embodiment.

The reference time information PCRa generated by the reference time generation unit 111 is wirelessly transmitted by the wireless transmission unit 122. The reference time information PCRa is used to synchronize the operation of an audio decoder 604 in the headphone 20c with the operation of the video decoder 106 in the television set 10c.

The wireless receiving unit 601 in the headphone 20c receives the audio data and the reference time information PCRa wirelessly transmitted from the wireless transmission unit 122 in the television set 10c.

The audio data buffer 603 temporarily stores the audio data received by the wireless receiving unit 601.

The audio decoder 604 sequentially reads and decodes the audio data stored in the audio data buffer 603, and outputs an audio signal.

The output audio signal is supplied to the speaker 220, from which audio is output.

The reference time generation unit 610 generates a reference clock and reference time information STC for audio decoding by the audio decoder 604. The frequency of the reference clock is, for example, 27 MHz.

At the start of operation, the audio decoder 604 is preferably controlled so as to start decoding after at least a certain amount of data has accumulated in the audio data buffer 603. This is done to enable the lag to be made up (by advancing the audio output) in case the audio output from the headphone 20c lags the video display on the television set 10c. The capacity of the audio data buffer 603 is preferably equal to or greater than the amount corresponding to the maximum anticipated delay.

The timings of audio data decoding and audio signal output by the audio decoder 604 are controlled according to the reference clock and the reference time information STC output from the reference time generation unit 610 and the DTS and PTS added to the audio data. That is, they are controlled so that audio decoding and output are performed when the reference time information STC generated by the reference time generation unit 610 has values matching the values of the DTS and PTS added to the audio data in each frame.

The STC counter 613 counts the clock generated by the clock generator 612 to generate the reference time information STC.

The reference time comparator 621 compares the reference time information PCRa received by the wireless receiving unit 601 with the reference time information STC generated by the reference time generation unit 610, and determines their difference:

$$dTC = STC - PCRa$$

The difference indicates the deviation of the reference time information STC from the reference time information PCRa, and accordingly the deviation between the timings of video display on the television set 10c and audio output from the headphone 20c.

The gain adjuster 622 multiplies the deviation by a prescribed gain and outputs the result. The low-pass filter 623 performs low-pass filtering on the output of the gain adjuster 622.

The oscillation frequency of the VCO 611 is controlled on the basis of the output (voltage signal) of the low-pass filter 623.

The clock generator 612 generates a clock with the oscillation frequency of the VCO 611 or a frequency proportional thereto.

As described above, the time generation control unit 620 comprising the reference time comparator 621, the gain adjuster 622, and the low-pass filter 623 controls the reference time generation unit 610 so that the reference time information STC generated by the reference time generation unit 610 matches the reference time information PCRa received by the wireless receiving unit 601.

The CPU 630 performs software computational processing, and software control of the entire headphone 20c.

Video decoding and display at the television set 10c and audio decoding and output at the headphone 20c are performed on the basis of DTS and PTS. That is, in the television set 10c, video decoding of each frame starts when the reference time information PCRa matches the video DTS in the frame, and video display of each frame starts when the reference time information PCRa matches the video PTS in the frame, while in the headphone 20c, audio decoding of each frame starts when the reference time STC matches the audio DTS in the frame, and audio output of each frame starts when the reference time STC matches the audio PTS in the frame.

Accordingly, if the reference time STC of the headphone 20c is brought into agreement with the reference time PCRa of the television set 10c, the audio output can be synchronized with the video display.

The third embodiment performs loop control (feedback control) by using the reference time generation unit 610 and the time generation control unit 620 in the headphone 20c, so that the reference time STC can be brought into agreement with the reference time PCRa, which enables the audio output to be brought into agreement with the video display.

The television set 10c transmits the audio data output from the TS decoder 103 from the wireless transmission unit 122 as is (i.e., without decoding the data) and, in the headphone 20c, the audio data received by the wireless receiving unit 601 is supplied to the audio decoder 604 via the audio data buffer 603, so that the time interval from output by the TS decoder 103 to input to the audio decoder 604 is short, and accordingly, it is not necessary to store a large amount of data (to allow for the maximum anticipated audio delay) in the video data buffer 105. Instead, the possibility that the video display may lag the audio output must be considered when determining the capacity of the audio data buffer 603, but the video display does not normally lag the audio output, so that it is not necessary to store a large amount of data in the audio data buffer 603 either.

The configuration in the third embodiment can synchronize video display and audio output even without transmitting information indicating the timings of audio decoding and/or audio output from the headphone 20c to the television set 10c.

Variations

The above description has concerned the case in which the video display device is a television set that receives a broadcast signal and outputs the audio and video of the broadcast content, but the invention is also applicable to cases in which an audio signal and a video signal are received from a device, such as a DVD device or BD device, for example, that reproduces audio and video from a recording medium, the video is displayed by a television set or another device having a display function while an audio signal is wirelessly transmitted to and output by an audio output device. The above description has also concerned the case in which the audio output device is a headphone, but the invention is likewise applicable when the audio output device is another device that outputs an audio signal received by wireless transmission, for example, a remote control with a built-in speaker.

REFERENCE CHARACTERS 10, 10b, 10c television set, 20, 20b, 20c headphone, 101 tuner, 102 demodulator, 103 TS decoder, 107 audio data buffer, 108 audio decoder, 105 video data buffer, 106 video decoder, 111 reference time generation unit, 114 frame counter, 116 frame counter, 117 sine wave oscillator, 119 audio multiplexer, 121, 121b wireless communication encoder, 122 wireless transmission unit, 131 wireless receiving unit, 132 count value recovery unit, 133 count value comparator, 134 adjustment value calculator, 140 CPU, 201 wireless receiving unit, 202 wireless communication decoder, 203, 203b count value recovery unit, 204 frequency measuring unit, 205 count value computation unit, 206 wireless transmission unit, 301 digital modulator, 302 digital multiplexer, 401 digital demodulator, 402 count value generation unit, 601 wireless receiving unit, 603 audio data buffer, 604 audio decoder, 610 reference time generation unit, 611 VCO, 612 clock generator, 613 STC counter, 620 time generation control unit, 621 reference time comparator, 622 gain adjuster, 623 low-pass filter, 630 CPU.

What is claimed is:

1. An audio/video reproduction system comprising a video display device and an audio output device,
the video display device displaying video and wirelessly transmitting, to the audio output device, an audio signal representing audio to be output in synchronization with the video,
the audio output device outputting the audio represented by the audio signal, wherein
the video display device comprises:

a video data buffer for temporarily storing video data representing the video;

a video decoder for sequentially reading and decoding the video data stored in the video data buffer and outputting a video signal;

a first counter configured to count the video frames decoded by the video decoder to generate a frame number of the video decoded by the video decoder as a reproduced video frame number;

an audio data buffer for temporarily storing audio data representing the audio;

an audio decoder for sequentially reading and decoding the audio data stored in the audio data buffer and outputting the audio signal;

a second counter configured to count the audio frames decoded by the audio decoder to generate a frame number of the audio decoded by the audio decoder as a reproduced audio frame number; and a wireless transmitter configured to wirelessly transmit the audio signal output from the audio decoder and the reproduced audio frame number generated by the second counter in association with each other;

the audio output device comprises:

a wireless receiver configured to receive the wirelessly transmitted audio signal and the wirelessly transmitted reproduced audio frame number, the audio output device being configured to process an output of the wireless receiver to recover the reproduced audio frame number; and a wireless transmitter configured to wirelessly transmit the reproduced audio frame number recovered by the audio output device to the video display device; and the video display device further comprises a processor programmed to control timing of decoding in the video decoder based on a difference between the reproduced video frame number generated by the first counter and the reproduced audio frame number wirelessly transmitted from the audio output device so as to reduce the difference, wherein the reproduced audio frame number generated by the second counter represents a value that varies cyclically in a range from a prescribed lower limit value to a prescribed upper limit value.

2. The audio/video reproduction system of claim 1, wherein the video display device comprises:

a digital modulator for digitally modulating the reproduced audio frame number;

a wireless communication encoder for encoding the audio signal decoded by the audio decoder and outputting a digital data stream; and a digital multiplexer for multiplexing the digital data stream output from the wireless communication encoder and the reproduced audio frame number modulated by the digital modulator and outputting multiplexed data; and the wireless transmitter of the video display device wirelessly transmits the multiplexed data output from the digital multiplexer to the audio output device.

3. The audio/video reproduction system of claim 1, wherein the audio output device comprises:

a digital demodulator for digitally demodulating the digitally modulated reproduced audio frame number received by the wireless receiver; and a counter that generates a frame count value from the data demodulated by the digital demodulator; and the frame count value generated by the counter is used as the recovered reproduced audio frame number.

4. The audio/video reproduction system of claim 2, wherein the digital modulator performs digital modulation by an amplitude modulation scheme.

5. The audio/video reproduction system of claim 2, wherein the digital modulator performs digital modulation by a frequency modulation scheme.

6. The audio/video reproduction system of claim 2, wherein the digital modulator performs digital modulation by a phase modulation scheme.

7. The audio/video reproduction system of claim 2, wherein the digital modulator performs digital modulation by a quadrature two-phase modulation scheme.

8. The audio/video reproduction system of claim 1, wherein the processor is programmed to:

determine a difference between the recovered reproduced audio frame number and the reproduced video frame number; and calculate an adjustment value based on the difference;

wherein the video decoder changes the timing of decoding by the adjustment value.

9. An audio/video reproduction system comprising a video display device and an audio output device, the video display device displaying video and wirelessly transmitting, to the audio output device, an audio signal representing audio to be output in synchronization with the video, the audio output device outputting the audio represented by the audio signal, wherein the video display device comprises:

a video data buffer for temporarily storing video data representing the video;

a video decoder for sequentially reading and decoding the video data stored in the video data buffer and outputting a video signal;

a first counter configured to count the video frames decoded by the video decoder to generate a frame number of the video decoded by the video decoder as a reproduced video frame number;

an audio data buffer for temporarily storing audio data representing the audio;

an audio decoder for sequentially reading and decoding the audio data stored in the audio data buffer and outputting the audio signal;

a second counter configured to count the audio frames decoded by the audio decoder to generate a frame number of the audio decoded by the audio decoder as a reproduced audio frame number; and a wireless transmitter configured to wirelessly transmit the audio signal output from the audio decoder and the reproduced audio frame number generated by the reproduced audio frame number generation unit in association with each other;

the audio output device comprises:

a wireless receiver configured to receive the wirelessly transmitted audio signal and the wirelessly transmitted reproduced audio frame number, the audio output device being configured to process an output of the wireless receiver to recover the reproduced audio frame number; and a wireless transmission unit for wirelessly transmitting the reproduced audio frame number recovered by the audio output device to the video display device; and the video display device further comprises:

a processor programmed to control timing of decoding in the video decoder based on a difference between the reproduced video frame number generated by the first counter and the reproduced audio frame number wirelessly transmitted from the audio output device so as to reduce the difference;
a sine wave oscillator for generating a sine wave with a frequency corresponding to the reproduced audio frame number;
an audio multiplexer for multiplexing the audio signal output from the audio decoder and the sine wave generated by the sine wave oscillator and outputting a multiplexed audio signal; and
a wireless communication encoder for encoding the multiplexed audio signal output from the audio multiplexer and outputting a digital data stream, wherein
the wireless transmitter in the video display device wirelessly transmits the digital data stream output from the wireless communication encoder to the audio output device.

10. A video display device for displaying video and wirelessly transmitting an audio signal representing audio to be output in synchronization with the video, the video display device comprising:
a video data buffer for temporarily storing video data representing the video;
a video decoder for sequentially reading and decoding the video data stored in the video data buffer and outputting a video signal;
a first counter configured to count the video frames decoded by the video decoder to generate a frame number of the video decoded by the video decoder as a reproduced video frame number;
an audio data buffer for temporarily storing audio data representing the audio;
an audio decoder for sequentially reading and decoding the audio data stored in the audio data buffer and outputting the audio signal;
a second counter configured to count the audio frames decoded by the audio decoder to generate a frame number of the audio decoded by the audio decoder as a reproduced audio frame number;
a wireless transmitter configured to wirelessly transmit the audio signal output from the audio decoder and the wirelessly transmitted reproduced audio frame number generated by the second counter in association with each other to an audio output device, wherein the wirelessly transmitted reproduced audio frame number is returned to the video display device from the audio output device via wireless transmission; and
a processor programmed to control timing of decoding in the video decoder based on a difference between the reproduced video frame number generated by the first counter and the reproduced audio frame number returned from the audio output device so as to reduce the difference, wherein
the reproduced audio frame number generated by the second counter represents a value that varies cyclically in a range from a prescribed lower limit value to a prescribed upper limit value.

11. A video display device for displaying video and wirelessly transmitting an audio signal representing audio to be output in synchronization with the video, the video display device comprising:
a video data buffer for temporarily storing video data representing the video;
a video decoder for sequentially reading and decoding the video data stored in the video data buffer and outputting a video signal;

a first counter configured to count the video frames decoded by the video decoder to generate a frame number of the video decoded by the video decoder as a reproduced video frame number;
an audio data buffer for temporarily storing audio data representing the audio;
an audio decoder for sequentially reading and decoding the audio data stored in the audio data buffer and outputting the audio signal;
a second counter configured to count the audio frames decoded by the audio decoder to generate a frame number of the audio decoded by the audio decoder as a reproduced audio frame number;
a wireless transmitter configured to wirelessly transmit the audio signal output from the audio decoder and the reproduced audio frame number generated by the second counter in association with each other, wherein the wirelessly transmitted reproduced audio frame number is returned to the video display device from the audio output device via wireless transmission;
a sine wave oscillator for generating a sine wave with a frequency corresponding to the reproduced audio frame number;
an audio multiplexer for multiplexing the audio signal output from the audio decoder and the sine wave generated by the sine wave oscillator and outputting a multiplexed audio signal;
a wireless communication encoder for encoding the multiplexed audio signal output from the audio multiplexer and outputting a digital data stream; and
a processor programmed to control timing of decoding in the video decoder based on a difference between the reproduced video frame number generated by the first counter and the reproduced audio frame number returned from the audio output device so as to reduce the difference, wherein
the wireless transmitter wirelessly transmits the digital data stream output from the wireless communication encoder to an audio output device.

12. An audio output device for receiving an audio signal transmitted wirelessly from a wireless transmitter in a video display device, and a reproduced audio frame number generated in the video display device when video data is decoded, and transmitted wirelessly from the wireless transmitter in the video display device, and outputting audio represented by the audio signal, the audio output device comprising:
a wireless receiver configured to receive the audio signal and the reproduced audio frame number wirelessly transmitted from the wireless transmitter, the audio output device being configured to process an output of the wireless receiver to recover the reproduced audio frame number; and
a wireless transmitter configured to wirelessly transmit the reproduced audio frame number recovered by the audio output device to the video display device; wherein
the video display device comprises:
a processor programmed to control timing of decoding in the video display device based on a difference between the reproduced video frame number generated in the video display device and the reproduced audio frame number wirelessly transmitted from the audio output device so as to reduce the difference;
a sine wave oscillator for generating a sine wave with a frequency corresponding to the reproduced audio frame number;

an audio multiplexer for multiplexing the audio signal decoded in the video display device and the sine wave generated by the sine wave oscillator and outputting a multiplexed audio signal; and a wireless communication encoder for encoding the multiplexed audio signal output from the audio multiplexer and outputting a digital data stream; wherein the wireless transmitter in the video display device wirelessly transmits the digital data stream output from the wireless communication encoder to the audio output device, and the audio output device is configured to:
  measure the frequency of the sine wave;
  calculate a corresponding frame count value based on the measured frequency; and
  using the calculated frame count value as the recovered reproduced audio frame number.

13. The audio/video reproduction system of claim 9, wherein the audio output device recovers the reproduced audio frame number by:
  measuring the frequency of the sine wave; and
  calculating a corresponding frame count value based on the measured frequency;
  wherein the calculated frame count value is used as the recovered reproduced audio frame number.

* * * * *